US010758801B1

(12) United States Patent
Erman

(10) Patent No.: US 10,758,801 B1
(45) Date of Patent: Sep. 1, 2020

(54) METHOD AND SYSTEM FOR PROPER KICKING TECHNIQUE

(71) Applicant: Focal Wellness, Inc., Carlsbad, CA (US)

(72) Inventor: Randal Erman, San Marcos, CA (US)

(73) Assignee: Focal Wellness, Inc., Carlsbad, CA (US)

(*) Notice: Subject to any disclaimer, the term of this patent is extended or adjusted under 35 U.S.C. 154(b) by 122 days.

(21) Appl. No.: 15/890,704

(22) Filed: Feb. 7, 2018

Related U.S. Application Data

(60) Provisional application No. 62/457,858, filed on Feb. 11, 2017.

(51) Int. Cl.
*A63B 69/00* (2006.01)
*A43B 3/00* (2006.01)
*G09B 19/00* (2006.01)
*G01P 15/02* (2013.01)
*A43B 5/02* (2006.01)

(52) U.S. Cl.
CPC .......... *A63B 69/002* (2013.01); *A43B 3/0005* (2013.01); *G09B 19/0038* (2013.01); *A43B 5/02* (2013.01); *G01P 15/02* (2013.01)

(58) Field of Classification Search
CPC ............ A63B 24/0062; A63B 2220/53; A63B 2220/836
See application file for complete search history.

(56) References Cited

U.S. PATENT DOCUMENTS

| | | | |
|---|---|---|---|
| 4,711,043 A * | 12/1987 | Johnson | A43B 23/00 36/139 |
| 4,774,966 A | 10/1988 | Lemmen | |
| 4,850,341 A | 7/1989 | Fabry et al. | |
| 5,031,640 A | 7/1991 | Spitzer | |
| 5,501,657 A | 3/1996 | Feero | |
| 5,676,476 A | 10/1997 | Uke | |
| 5,851,191 A | 12/1998 | Gozani | |
| 6,006,751 A | 12/1999 | Spitzer | |
| 6,045,517 A | 4/2000 | Williams | |
| 6,179,852 B1 | 1/2001 | Strickland et al. | |
| 6,510,346 B2 | 1/2003 | Gordon | |
| 6,530,893 B1 | 3/2003 | Castelli | |
| 6,808,462 B2 * | 10/2004 | Snyder | A43B 3/00 36/1 |
| 6,852,067 B2 | 2/2005 | Limonadi | |
| 6,893,396 B2 | 5/2005 | Schulze et al. | |
| 7,344,511 B2 | 3/2008 | Porrata et al. | |

(Continued)

OTHER PUBLICATIONS

International Search Report for PCT/US2017/058516 dated Feb. 21, 2018.

*Primary Examiner* — Dmitry Suhol
*Assistant Examiner* — Carl V Larsen
(74) *Attorney, Agent, or Firm* — Clause Eight IPS; Michael Catania

(57) ABSTRACT

A device, system and method for determining a proper kick technique is disclosed herein. The device preferably comprises a body configured to be worn on a foot of a user, sensors, a processor, an alert mechanism, and a power source. The sensors are preferably piezoelectric sensors. The device preferably provides feedback to a player by informing the player that the player has struck a ball with a proper surface of the player's foot.

3 Claims, 9 Drawing Sheets

(56) References Cited

U.S. PATENT DOCUMENTS

| | | |
|---|---|---|
| 7,364,559 B2 | 4/2008 | Williams |
| 7,834,851 B1 | 11/2010 | Fidali et al. |
| 7,942,918 B2 | 5/2011 | Herzberg et al. |
| 9,223,956 B2 | 12/2015 | Hong et al. |
| 9,387,109 B2 | 7/2016 | Keoshian et al. |
| 9,808,208 B1 | 11/2017 | Erman |
| 10,293,207 B1* | 5/2019 | Matak ................ A63B 24/0006 |
| 2002/0140674 A1 | 10/2002 | Okuno et al. |
| 2006/0004302 A1 | 1/2006 | Tuckett et al. |
| 2007/0156158 A1 | 7/2007 | Herzberg et al. |
| 2007/0157488 A1* | 7/2007 | Guzman ............ A43B 3/0005 36/132 |
| 2008/0181917 A1 | 7/2008 | Pappagallo et al. |
| 2008/0204225 A1 | 8/2008 | Kitchen |
| 2009/0062707 A1 | 3/2009 | Busuttil |
| 2009/0143704 A1 | 6/2009 | Bonneau et al. |
| 2010/0184563 A1* | 7/2010 | Molyneux ........... A43B 1/0054 482/1 |
| 2011/0033830 A1 | 2/2011 | Cherian |
| 2011/0208100 A1 | 8/2011 | Eck et al. |
| 2011/0230805 A1 | 9/2011 | Oron |
| 2012/0317693 A1 | 12/2012 | Hatz |
| 2013/0274587 A1* | 10/2013 | Coza .................... A61B 5/6804 600/409 |
| 2014/0236059 A1 | 8/2014 | Son |
| 2014/0296760 A1 | 10/2014 | Keoshian et al. |
| 2014/0343473 A1 | 11/2014 | Hoffman |
| 2015/0190673 A1* | 7/2015 | Robinson ............... A63B 23/08 482/8 |
| 2015/0306373 A1 | 10/2015 | Bouton et al. |
| 2015/0328516 A1* | 11/2015 | Coza .................... A63B 69/002 473/446 |
| 2015/0352419 A1* | 12/2015 | Pappas ................ A63B 69/002 473/422 |
| 2015/0362331 A1* | 12/2015 | Sanchez ................ G01R 33/02 702/153 |
| 2016/0015280 A1 | 1/2016 | Hyde et al. |
| 2016/0136502 A1* | 5/2016 | Voutilainen ............. A61B 5/11 73/865.4 |
| 2016/0162002 A1* | 6/2016 | Liang .................. G06F 1/3206 713/323 |
| 2016/0296406 A1 | 10/2016 | Heyl |
| 2017/0156662 A1 | 6/2017 | Goodall et al. |
| 2017/0164876 A1 | 6/2017 | Hyde et al. |
| 2017/0169695 A1* | 6/2017 | Poisner ................... A63F 13/46 |
| 2019/0069243 A1* | 2/2019 | Bean ..................... G06F 1/3206 |
| 2019/0151742 A1* | 5/2019 | Li ....................... A63B 71/0622 |

\* cited by examiner

METHOD AND SYSTEM FOR PROPER KICKING TECHNIQUE

CROSS REFERENCE TO RELATED APPLICATION

The Present Application claims priority to U.S. Provisional Patent Application No. 62/457,858, filed on Feb. 11, 2017, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to kicking techniques.

Description of the Related Art

Every year millions of new children start to play Soccer or what the Europeans call Futbol. The game of soccer consists of players on a field kicking a ball into a net. Training children to kick a ball properly takes a considerable deal of time and patience by all those involved, and there has not been a good technology solution to help people with this task. Nearly all children start to kick a ball by having the ball strike their toe while doing a normal walking stride at the ball which is worst way to kick a ball. Toe kicks generally have the lowest accuracy due to the curvature of the shoes surface around the toe, the lowest amount of power due to the low amount of surface connecting with the ball, and the biggest likelihood of injury to the player as the phalange are weak bones. In reality the ball should be struck as high up the foot as possible near the cuneiform as opposed to the phalange. In terms most people will understand, if you were going to punch something you would use your knuckles as opposed to your fingers.

Since most players learn to first kick with toe it becomes a challenge to break this habit and train them to strike the ball with the proper surface.

BRIEF SUMMARY OF THE INVENTION

To solve this problem a proper kicking technique system and method has been invented to help give feedback to a player by informing the player that the player has struck a ball with a proper surface of the player's foot.

One aspect of the present invention is a device for training proper kick mechanics. The device comprises a body configured to be worn by a user, sensors, a processor, and a power source. The sensors monitor the location of the ball strike as well as the force by which the ball was struck. The processor of the article is configured to determine the location of the ball strike and the force by which was the ball was struck and alert the user if the ball was struck properly.

Another aspect of the present invention is a device for training proper kick mechanics. The device comprises a body configured to be worn by a user, sensors, a wireless transceiver, a processor, and a power source. The sensors monitor the location of the ball strike as well as the force by which the ball was struck. The processor of the article is configured to determine the location of the ball strike and the force by which was the ball was struck and alert the user if the ball was struck properly.

Another aspect of the present invention is a system for training proper kick mechanics. The system comprises a wearable device and a computing device. The device comprises a body configured to be worn by a user, sensors, a wireless transceiver, a processor, and a power source. The computing device comprises a display screen, a processor, a wireless transceiver, and a software application. The sensors monitor the location of the ball strike as well as the force by which the ball was struck. The processor of the article is configured to determine the location of the ball strike and the force by which was the ball was struck and alert the user if the ball was struck properly. An alert signal is received at the wireless transceiver of the computer and the application is configured to display information on the display screen regarding the kick.

Yet another aspect of the present invention is a method for training proper kick mechanics. The method comprises monitoring the ankle position using a plurality of sensors on an article. The method also includes determining that the foot position from a signal from the plurality of sensors. The method also includes generating an alert signal on the article to alert the user to foot positioning.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

A system for a proper kicking technique preferably has a device which is embedded into the material of a shoe/cleat or into a sleeve which goes around the shoe/cleat and ankle, and the device has one or more force sensors, one or more microprocessors, and one or more power sources.

Figure 1:
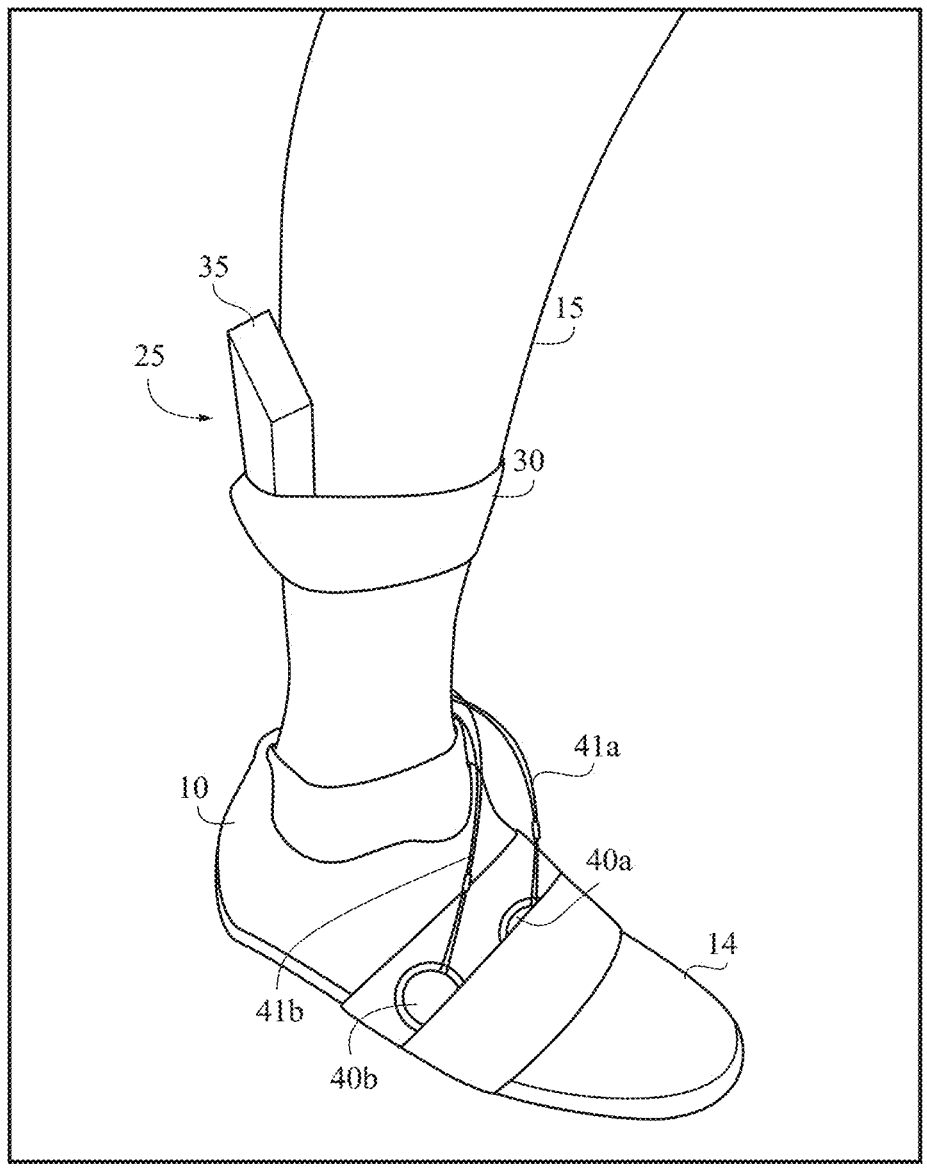
FIG. 1 illustrates the device for training proper kick mechanics on a foot of a user.

As shown in FIG. 1, a user wears the device 25 on the user's leg 15 and foot 14. The device 25 preferably has a wearable article 30 and a processing component 35. The article 30 is preferably wrapped around the user's lower leg and a shoe 10. Sensors 40a and 40b are connected to the processing component 35 through wires 41a and 41b.

Figure 2A:
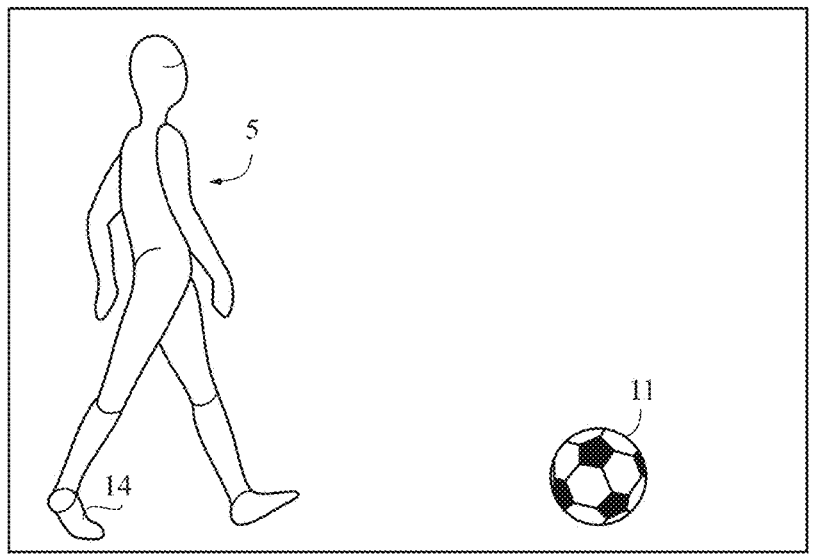
FIG. 2A illustrates a player walking toward a soccer ball.
Figure 2B:
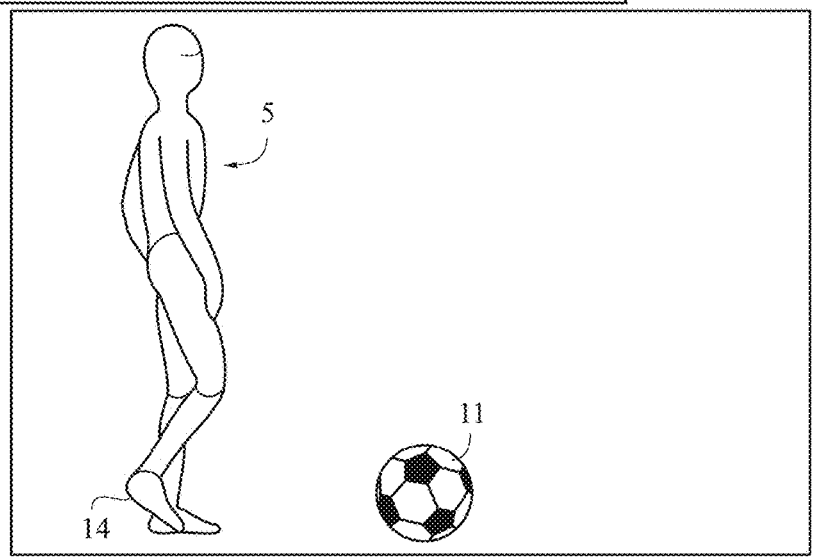
FIG. 2B illustrates a player walking toward a soccer ball.
Figure 2C:
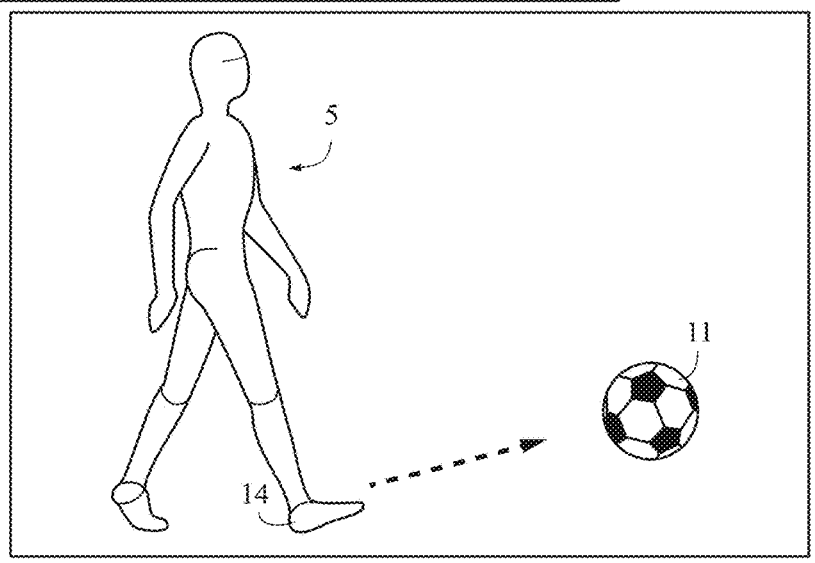
FIG. 2C illustrates a player kicking a soccer ball.

As shown in FIGS. 2A, 2B and 2C, a player 5 learns proper kicking technique by walking toward a soccer ball 11 and kicking the ball 11 with the player's foot 14 as part of a walking stride.

Figure 3A:
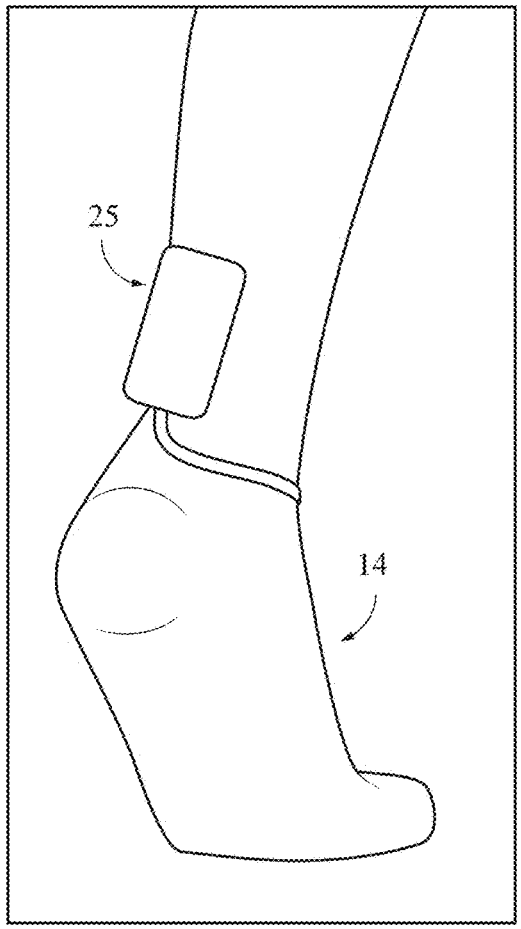
FIG. 3A illustrates a rear of a foot of a user with the device for training proper kick mechanics thereon.
Figure 3B:
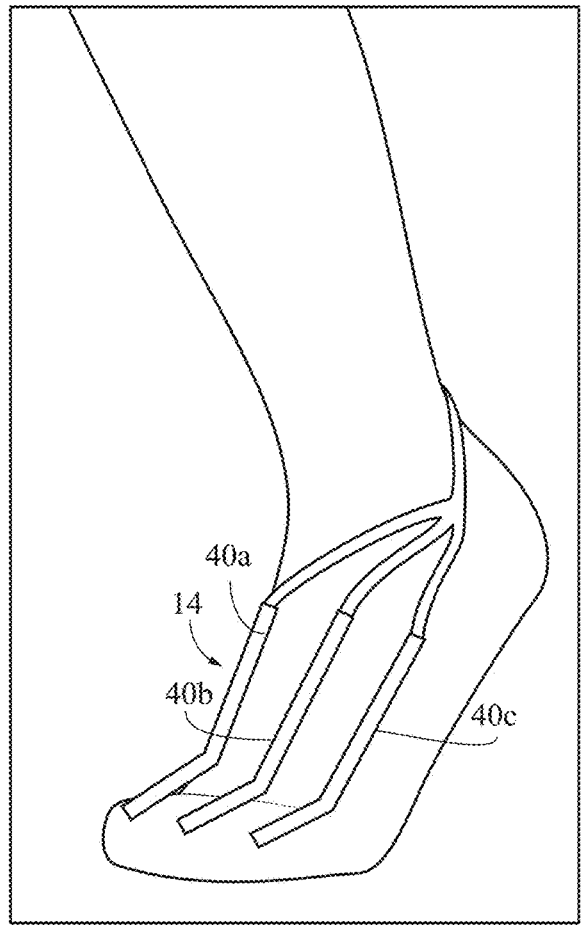
FIG. 3B illustrates a front of a foot of a user with the device for training proper kick mechanics thereon.

FIGS. 3A and 3B illustrate a foot 14 of a user with the device 25 for training proper kick mechanics positioned thereon. Sensors 40a, 40b and 40c are positioned on the front of the foot 14 to measure contact forces and contact position when the user kicks a ball.

Figure 4:
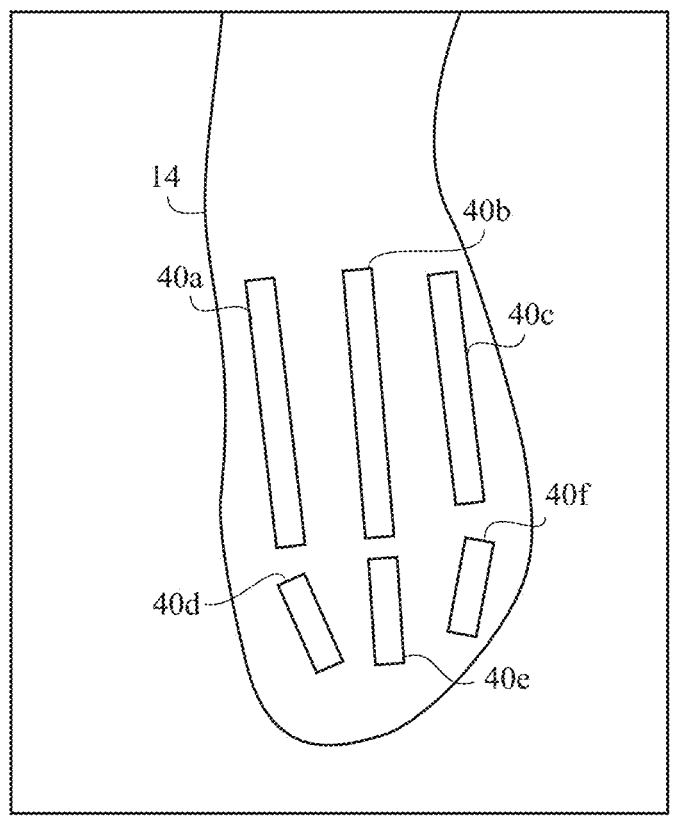
FIG. 4 illustrates a front of a foot of a user with the sensors of a device for training proper kick mechanics thereon.
Figure 4A:
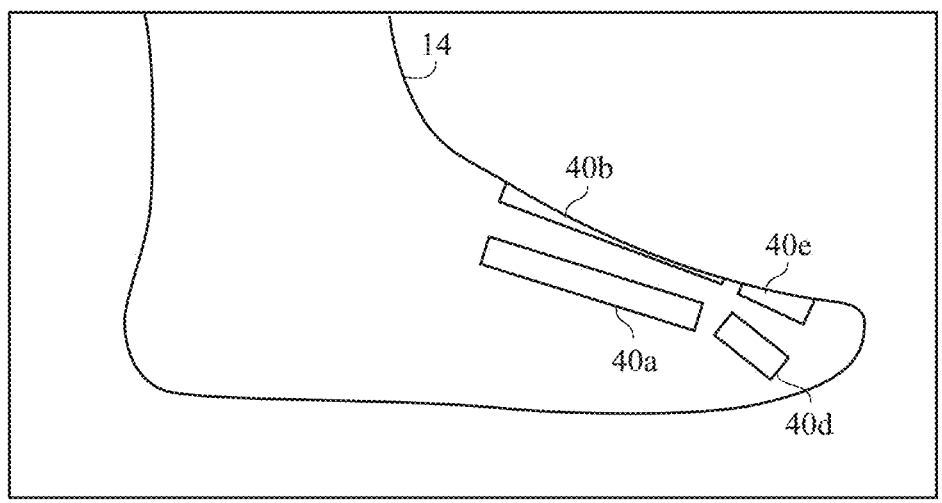
FIG. 4A illustrates a side of a foot of a user with the sensors of a device for training proper kick mechanics thereon.

FIGS. 4 and 4A illustrate a foot 14 of a user with the device 25 for training proper kick mechanics positioned thereon. Sensors 40a, 40b, 40c, 40d, 40e and 40f are positioned on the front and top of the user's foot 14 to measure contact forces and contact position when the user kicks a ball. Although this embodiment illustrates the use of six sensors, those skilled in the pertinent art will recognize that more or less sensors may be used without departing from the scope and spirit of the present invention.

Figure 5:
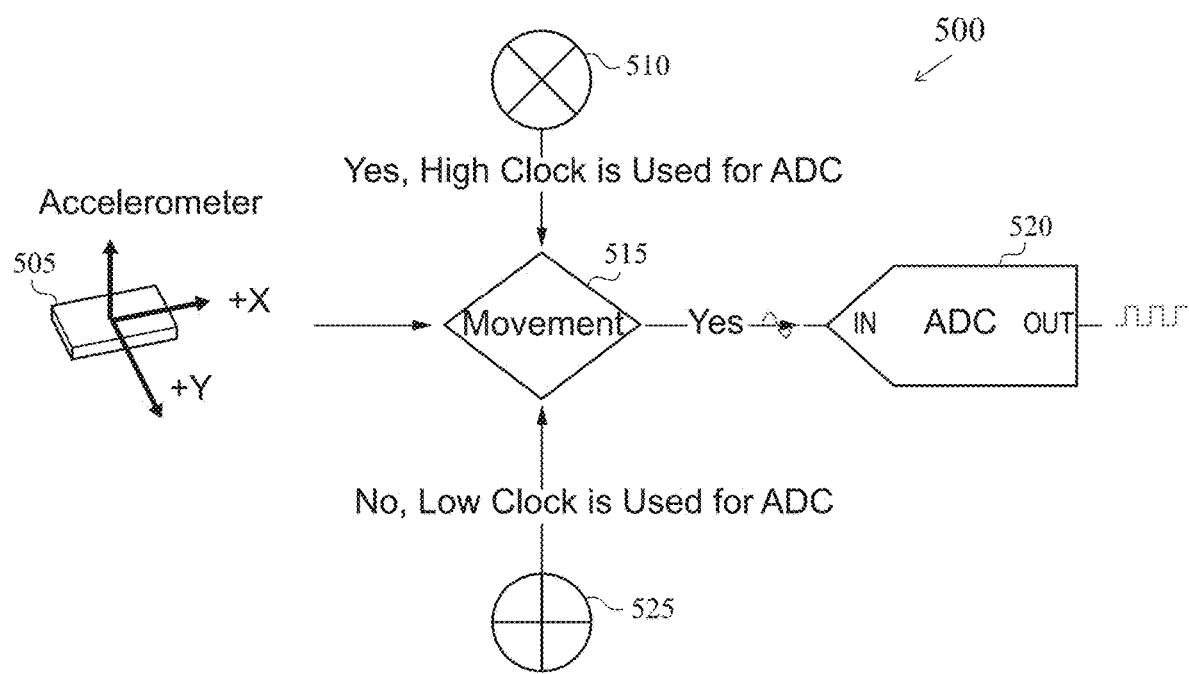
FIG. 5 is a block diagram of components of a device for training proper kick mechanics.

FIG. 5 is a block diagram 500 of components of a device 25 for training proper kick mechanics. A processor receives signals from an accelerometer 505 for movement of the device 25. If a motion profile indicates a kick, then at 510 the analog-to-digital converter ("ADC") 520 is set to a high clock mode of approximately 1.2 MHz at 510. If the motion profile does not indicate a kick, then the ADC 520 maintains a low clock mode at 525 of approximately 32 kHz. The device 25 preferably uses the motion profile to minimize power consumption.

The device 25 for a proper kicking technique preferably includes one more audio speakers to signal a positive result.

The device 25 for a proper kicking technique preferably includes a haptic feedback device located on the sleeve or within the shoe which will give feedback depending upon the force of the strike.

The device 25 for a proper kicking technique preferably includes multiple IMUs which allow for recording of ankle position in relation to fibula and tibula.

The device 25 for a proper kicking technique preferably includes a wireless connectivity solution to allow for recording of forces and or ankle position and sensor strike location.

The device 25 for a proper kicking technique preferably includes a mechanism for generating different types of audio based on maximum strike force.

The device 25 for a proper kicking technique preferably counts the number of strikes for juggling.

The device 25 for a proper kicking technique preferably includes a software application that communicates over the wireless connectivity solution to show information to the user about the status of the sensors.

The device 25 for a proper kicking technique preferably includes a cloud component where the data that is sent back to the processing unit is then sent to a cloud database for remote processing and charting.

Another embodiment is a mechanism to detect different pressures from different sensors and provide feedback to a user either via visual, audio, or electronic means.

Another embodiment is an algorithm to detect a kick versus general foot movements such as walking, jogging or walking.

Another embodiment is audio tones generated when a sensor has been compressed into a soccer ball.

In one embodiment, the device 25 is preferably composed of a microprocessor with embedded wireless technology such as WiFi, BT, BTLE, UWB, or NFC, and the needed sensor technology.

In one embodiment, the system preferably comprises a microprocessor, a wireless chipset such as WiFi, BT, BTLE, UWB or NFC, a plurality of 10 Degree of Freedom (DOF) sensor technology (Gyroscopes), and a battery.

In an alternative embodiment, the device 25 preferably comprises a microprocessor, a wireless chipset such as WiFi, BT, BTLE, UWB or NFC, a plurality of accelerometers, and a battery.

The device 25 preferably includes a charging circuit depending upon which type of battery technology is in the device 25. The device 25 preferably includes LEDs to indicate if the kicking technique was proper.

In one embodiment, the device 25 is preferably configured with any number of IMUs directly integrated onto the same board as the microprocessor, or a subset of IMUs directly integrated onto the same board as the microprocessor and remaining subset connected to that board in some fashion, or all IMUs connected to the microprocessor board in some manner.

One embodiment is a device 25 for training proper kick mechanics. The device comprises a body configured to be worn by a user, sensors, a processor, and a power source. The sensors monitor the location of the ball strike as well as the force by which the ball was struck. The processor of the article is configured to determine the location of the ball strike and the force by which was the ball was struck and alert the user if the ball was struck properly.

The sensors are preferably a plurality of inertia measurement units (IMU), which includes: accelerometer, gyroscope and magnetometer capabilities used to detect the angle the foot is positioned in relation to the ankle.

The sensors are alternatively a plurality of piezoelectric sensors used to detect the force and location of a ball being struck.

The sensors are alternatively a plurality of inertia measurement units (IMU), which includes: accelerometer, gyroscope and magnetometer capabilities and a plurality of piezoelectric sensors used to the force and location of a ball being struck.

The device 25 preferably has a plurality of LEDs for indication of a proper kick.

The device 25 alternatively has a vibration mechanism for indication of a proper or improper kick.

The device 25 is alternatively integrated into a shoe or cleat.

The device 25 is alternatively integrated into a sleeve which is worn above a shoe or cleat.

The device 25 is preferably affixed directly to the skin.

Another embodiment is a system for training proper kick mechanics. The system comprises a wearable device and a computing device. The device comprises a body configured to be worn by a user, sensors, a wireless transceiver, a processor, and a power source. The computing device comprises a display screen, a processor, a wireless transceiver, and a software application. The sensors monitor the location of the ball strike as well as the force by which the ball was struck. The processor of the article is configured to determine the location of the ball strike and the force by which was the ball was struck and alert the user if the ball was struck properly. An alert signal is received at the wireless transceiver of the computer and the application is configured to display information on the display screen regarding the kick.

The software application is preferably configured to determine the location of a ball strike. The software application is alternatively configured to determine the force applied to the ball during the kick and at what speed the ball left the foot.

The alert signal is an audio alert, a visual alert or a vibration mechanism being executed on the device.

Another embodiment is a device 25 for training proper kick mechanics. The device comprises a body configured to be worn by a user, sensors, a wireless transceiver, a processor, and a power source. The sensors monitor the location of the ball strike as well as the force by which the ball was struck. The processor of the article is configured to determine the location of the ball strike and the force by which was the ball was struck and alert the user if the ball was struck properly.

The wireless transceiver preferably operates on a communication format selected from the group consisting of WiFi, BLUETOOTH, BLUETOOTH low energy, UWB, and near-field communications.

Figure 6:
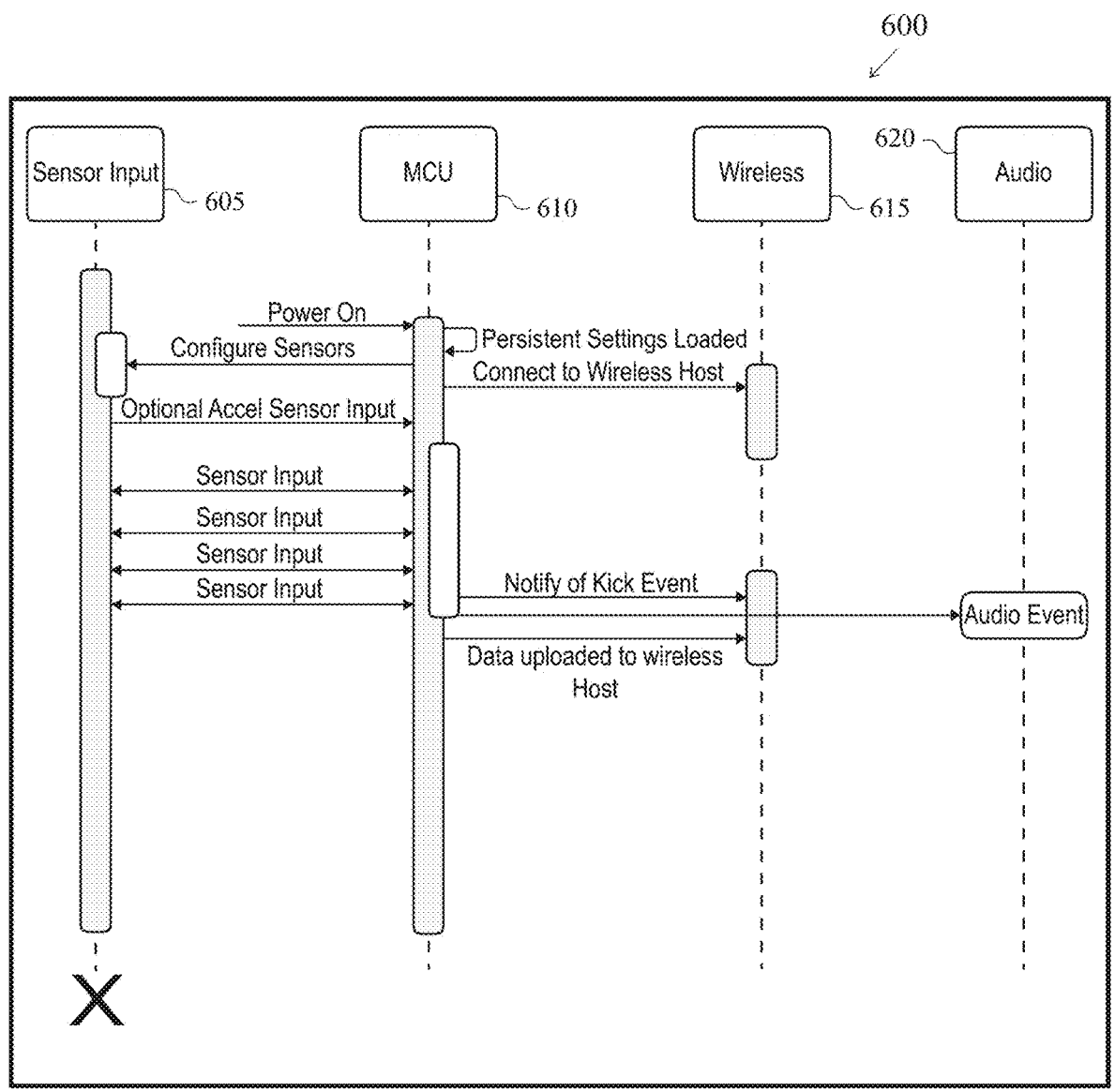
FIG. 6 is a communication sequence diagram for a device for training proper kick mechanics.

FIG. 6 is a communication sequence diagram 600 for a device for training proper kick mechanics. A microprocessor 610 powers on the device 25, configures the sensors 40 and connects to a wireless transceiver 615. The sensor input 605 includes an optional accelerometer sensor input to the processor. The sensor input 605 sends signals indicative of a kick event to the processor 610, which sends a kick event signal to the wireless transceiver 615. An audio event is also sent from the processor 610 to the audio mechanism 620. Data is uploaded from the processor 610 to the wireless transceiver 615.

Figure 7:
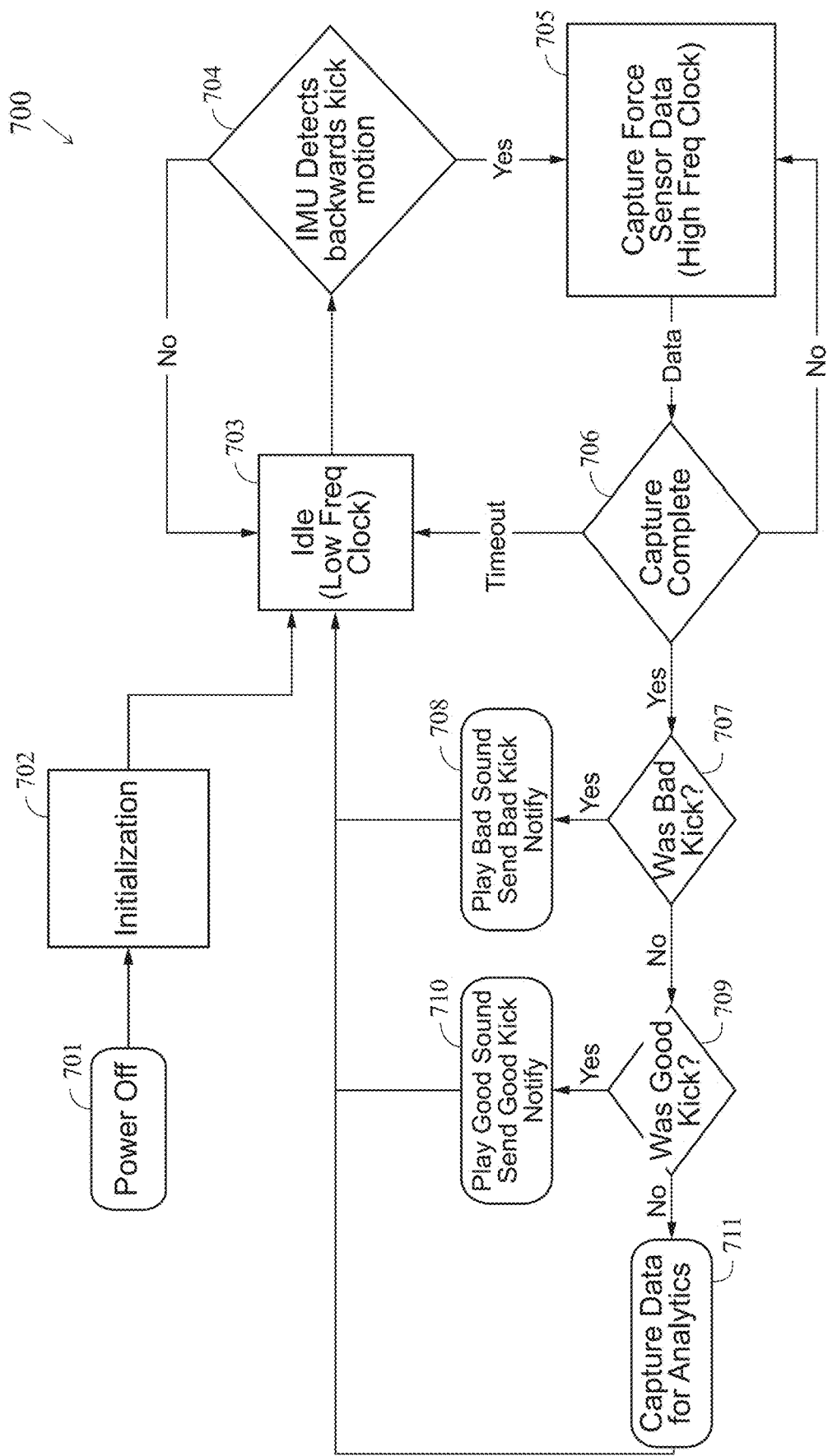
FIG. 7 is a flow chart for a method for a device for training proper kick mechanics.

FIG. 7 is a flow chart for a method 700 for a device 25 for training proper kick mechanics. At block 701, the device is powered on. At block 702, the device 25 is initialized. At block 703, the device 25 operates in a low frequency clock mode. At block 704, an inquiry of a backward kick motion is made by the processor. If no backward kick motion is detected, then the device maintains a low frequency clock mode to minimize power consumption. If a backward kick motion is detected, that at block 705 the device 25 operates in a high frequency clock mode to capture force sensor data. At block 706, an inquiry of complete data capture is made. If the data capture is not complete, then the device 25 returns to the high frequency clock mode. If it is complete the device 25 returns to a low frequency clock mode. A bad kick inquiry is made at block 707. If yes, a bad kick notification is made at block 708. If not, at block 709 a good kick inquiry is made. If yes, a good kick notification is generated at block 710. If no, at block 711 the data analytics are captured.

Figure 8:
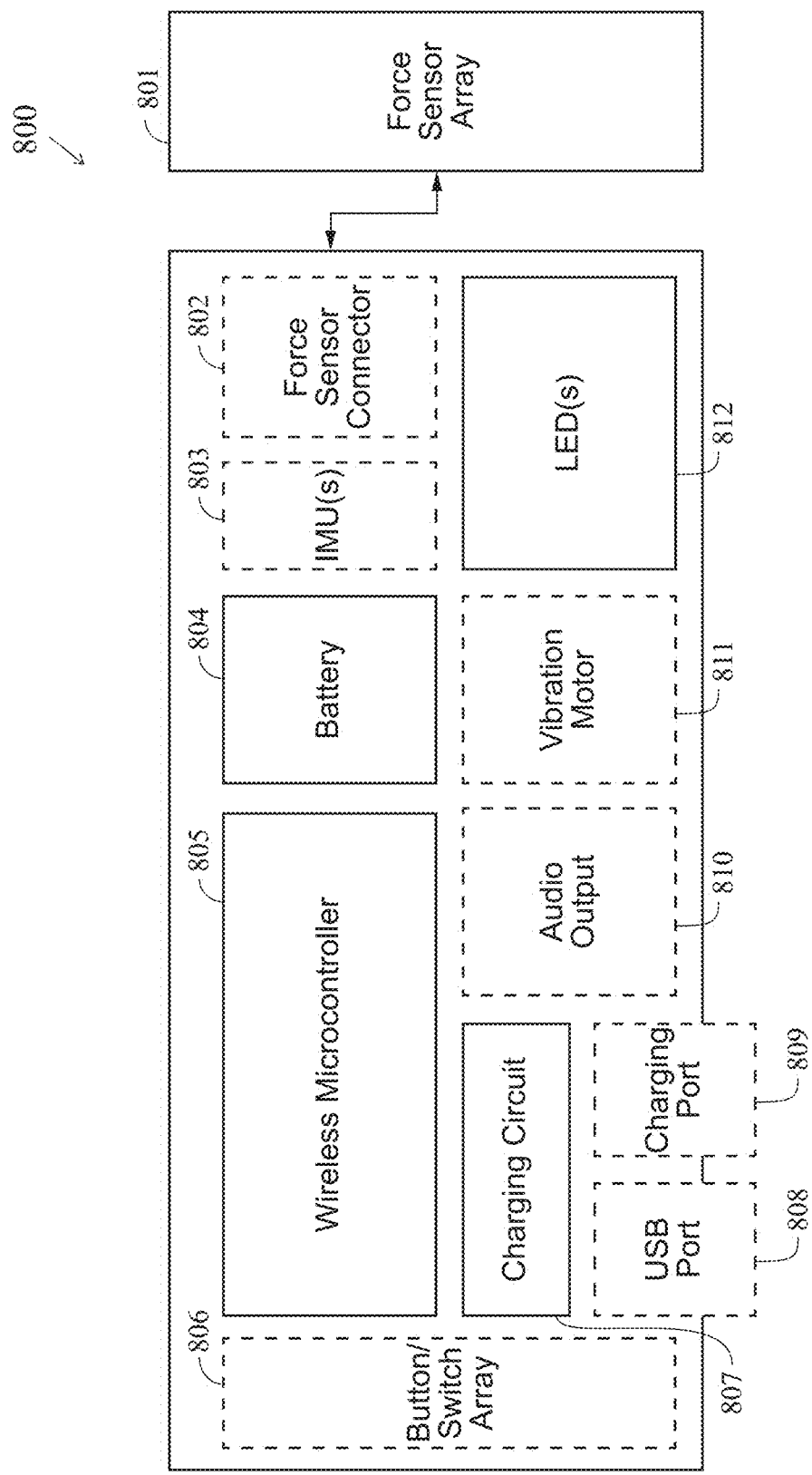
FIG. 8 is a block diagram for a device for training proper kick mechanics.

FIG. 8 is a block diagram for a device 800 for training proper kick mechanics. The device 800 includes a force sensor array 801, a force sensor connector 802, IMUs 803, a battery 804, a wireless microcontroller 805, a button/switch array 806, a charging circuit 807, a USB port 808, a charging port 809, an audio output 810, a vibration motor 811 and LEDs 812.

Figure 9:
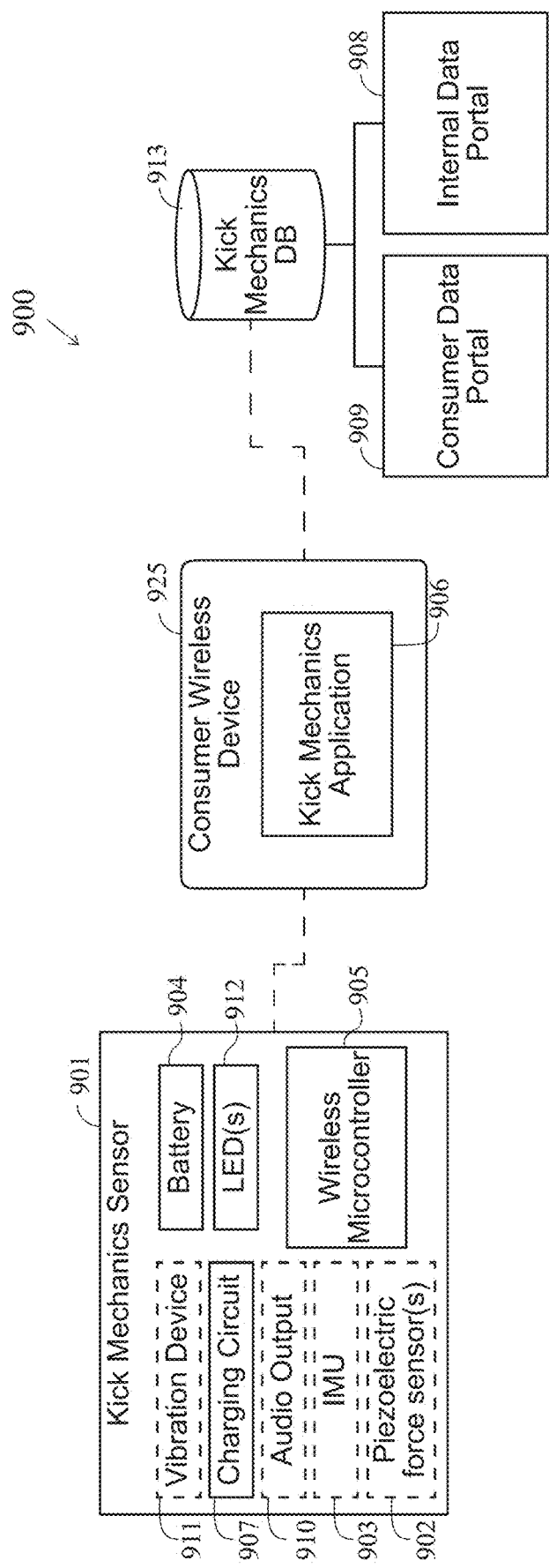
FIG. 9 is a block diagram for a system for training proper kick mechanics.

FIG. 9 is a block diagram for a system 900 for training proper kick mechanics. The system 900 preferably includes a kick mechanics sensor 901, a consumer wireless device 925, a kick mechanics database 913, a consumer data portal 909 and an internal data portal 908. The consumer wireless device 925 includes a kick mechanics software application 906 that runs on the device 925. Preferably the consumer wireless device 925 is a smart phone or tablet computer. The kick mechanics sensor 901 preferably includes a piezoelectric force sensor 902, an IMU 903, a wireless microcontroller 905, a battery 904, LEDs 912, an audio output 910, a charging circuit 907 and a vibration device 911.

Preferably a BGM113 BTLE chipset with a CORTEX M4 processor from Silicon Labs is the combination wireless transceiver and processor chipset utilized with the device 25. Preferably a lithium polymer 80 milliamps power battery is utilized with the device 25. Preferably a ST Micro FS-L-0095-103-ST IMU sensor is utilized with the device 25.

Erman, U.S. Pat. No. 9,808,208 for a Carpal Tunnel Infomatic Monitor is hereby incorporated by reference in its entirety.

Erman, U.S. patent application Ser. No. 15/802,420, filed on Nov. 2, 2017, for a Cubital Tunnel Infomatic Monitor is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A method for training proper kick mechanics, the method comprising:

monitoring an ankle position of a foot of a user using a plurality of sensors and processing component on a wearable article, wherein the wearable article is configured to wrap around a user's leg and shoe, wherein a first set of the plurality of sensors is positioned on a front of the shoe and configured to measure contact forces and contact position when a user kicks a ball;

receiving at a processor on the processing component a signal from an accelerometer of the plurality of sensors that the foot of the user is in a backward kicking motion;

transmitting a signal from the processor to an analog to digital converter ("ADC") to switch from a sleep mode to an active mode;

measuring, at the plurality of sensors, a force of the foot driving through a ball;

determining a location of a ball impact on the foot of the user;

and generating an audio alert signal on the article to alert the user to foot positioning.

2. The method according to claim 1 wherein the plurality of sensors is a plurality of inertia measurement unit sensors which includes: accelerometer, gyroscope and magnetometer capabilities.

3. The method according to claim 1 wherein the plurality of sensors is a plurality of inertia measurement unit sensors which includes: accelerometer, gyroscope and magnetometer capabilities and a plurality of piezoelectric sensors used to detect the ankle position in relation to the plurality of inertia measurement unit sensors.

* * * * *